United States Patent [19]

Niiya

[11] Patent Number: 4,745,291

[45] Date of Patent: May 17, 1988

[54] APPARATUS FOR MEASURING THICKNESS OF LAYER ON SUBSTANCE

[75] Inventor: Masanori Niiya, Osaka, Japan

[73] Assignee: Chugai Ro Co., Ltd., Osaka, Japan

[21] Appl. No.: 33,109

[22] Filed: Mar. 31, 1987

[30] Foreign Application Priority Data

Apr. 1, 1986 [JP] Japan .................................. 61-76022

[51] Int. Cl.$^4$ ............................................ G01N 21/86
[52] U.S. Cl. .................................. 250/560; 250/341; 356/382
[58] Field of Search ............... 250/560, 561, 232, 233, 250/341, 347, 348, 339; 356/381, 382

[56] References Cited

U.S. PATENT DOCUMENTS

| | | | |
|---|---|---|---|
| 3,433,052 | 3/1969 | Maley | 73/15 |
| 3,973,122 | 8/1976 | Goldberg | 250/341 |
| 3,994,586 | 11/1976 | Sharkins et al. | 250/341 |
| 4,027,161 | 5/1977 | Williams et al. | 250/341 |
| 4,549,079 | 10/1985 | Terasaka et al. | 250/339 |
| 4,687,333 | 8/1987 | Odasima et al. | 356/382 |

Primary Examiner—David C. Nelms
Attorney, Agent, or Firm—Wenderoth, Lind & Ponack

[57] ABSTRACT

A surface layer thickness measuring apparatus lower in price with the use of a light ray measuring system only. The correct surface layer thickness may be measured, independently of the variation in the temperature of the measured, in the external light rays, in the radiation energy of the reference light ray source, in the chopper temperature, the influences by the temperature in the surface layer thickness measuring apparatus, through the mode combination by the driving operation of the opening and closing device and the total reflection mirror.

3 Claims, 4 Drawing Sheets

APPARATUS FOR MEASURING THICKNESS OF LAYER ON SUBSTANCE

BACKGROUND OF THE INVENTION

The present invention relates to an apparatus for measuring the thickness of electromagnetic wave absorption surface layer such as water, film, paint or the like applied or attached on the surface of substance such as base plate surfaces, by which the electromagnetic waves such as light rays are caused to reflect toward the apparatus through the layer.

Conventionally, the various apparatuses are proposed as a coated film thickness measuring apparatus which is the surface layer thickness measuring apparatus. For example, Japanese Patent Application Publication (unexamined) Tokkaisho No. 58-115306 is provided. However, according to this system, two units of infrared ray measuring systems are required under the necessity of correction for errors to be caused by the temperature of an object to be measured. Thus, the price of this system becomes higher, and the characteristics of each infrared ray measuring systems are actually different so as to cause the correction error between the systems. Also, the automatic correction for the defect of this system is not performed through not only the variation in the characteristics of the reference infrared ray source, but the time-lapse variation in the electric system and the optical system. Furthermore, although various apparatuses for performing the automatic correction through the time-lapse variation are proposed, they cannot make sufficient corrections both in electric and optical systems.

SUMMARY OF THE INVENTION

An object of the present invention is to provide a surface layer thickness measuring apparatus which is capable of correctly measuring the thickness of a layer provided on the surface of a substance, what is called as the surface layer thickness, independently of influences through the variations in the temperature of the measured material and the characteristics of the reference light ray source and the time-lapse variations in the characteristics in the electric and optical systems on the employment of only one light ray measuring system.

In order to achieve the above-described object, the present invention provides a surface layer thickness measuring apparatus, comprising, in combination, a reference light ray source for radiating light rays in a given level, a mirror for reflecting the light rays coming from the reference light ray source against the surface of a layer applied to the surface of a substance, an opening or closing means located between said mirror and said reference light ray source to perform the screening operation and the opening operation between them, a plane total reflection mirror located between said mirror and the measured surface layer to be measured to perform the screening operation and the opening operation between them, a light ray sensor for detecting the light ray amount from said plane total reflection mirror or the light ray amount reflected on said substance without being totally absorbed by said surface layer to be measured, a mode discriminating device for discriminating the combination of said opening or closing means and said plane total reflection mirror, a signal processing device for calculating the signals so that the signals showing only the light ray amount either absorbed by said surface layer to be measured or reflected by a substance without being absorbed by said surface layer may be drawn out from the light ray sensor output, and a surface layer thickness converting device for converting the signals from said signal processing device into the surface layer thickness.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

The present invention will be described hereinafter with reference to the drawings in one embodiment wherein the coated film thickness of the substance is measured by the use of the infrared rays as the light rays.

Figure 1:
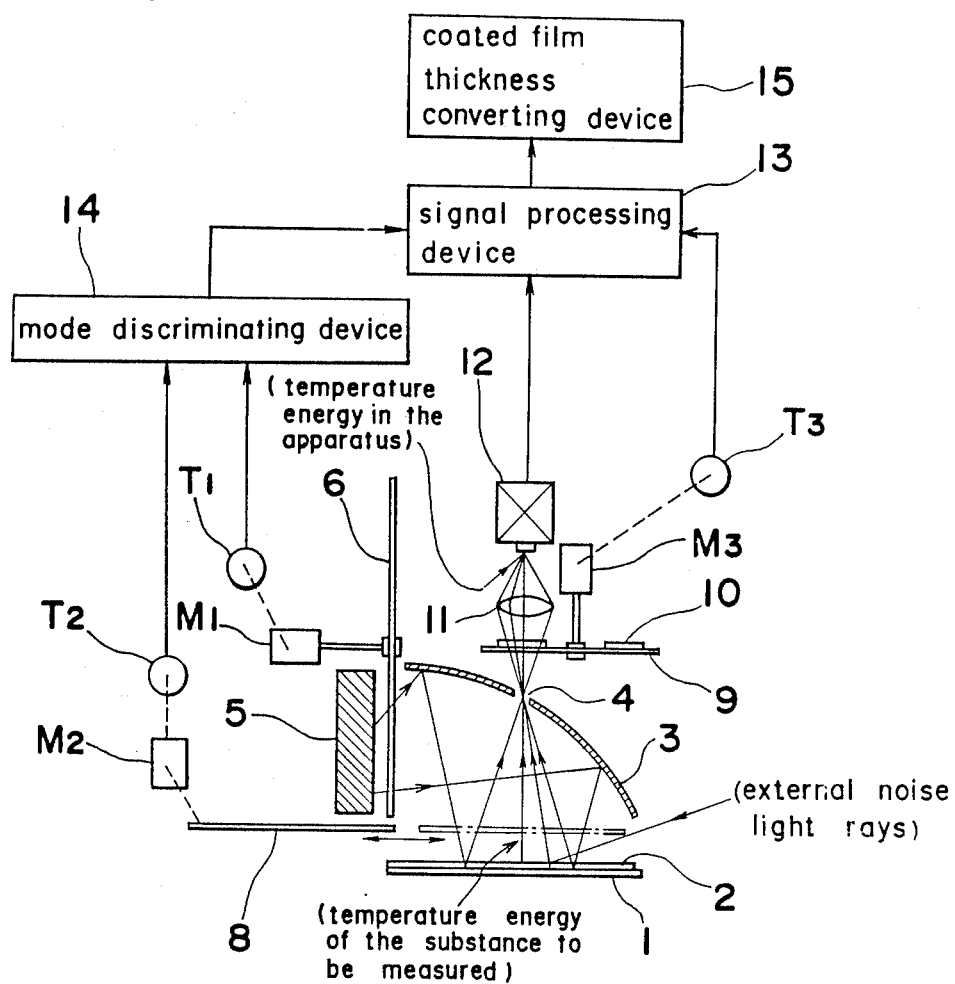
FIG. 1 is a schematic illustration view across the mirror of a surface layer thickness measuring apparatus in accordance with the present invention.
Figure 2:
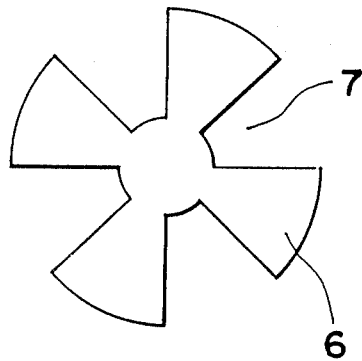
FIG. 2 and FIG. 3 show the respective front-face views of an opening or closing means and a rotary sector.
Figure 3:
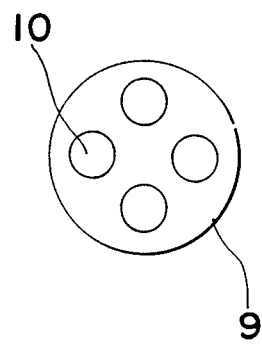

Referring to FIG. 1, a substance 1, which does not absorb but reflects the light rays, for instance, a metalic sheet and the like, with a coated film 2, i.e., material to be measured, provided on the top face thereon is adapted to run in a direction. A mirror 3, for instance, a spherical reflection mirror is fixedly provided above the substance 1 to stably reflect towards the substance 1 a given amount of infrared rays coming from a reference infrared ray source 5, for instance, a black-body radiator, as the reference light ray source to be described later, under opening one side portion thereof to the outside, providing with an aperture 4 at the focus portion of a condenser 11, i.e., a focusing lens which is adapted to focus the infrared rays. This mirror 3 is adapted to reflect the infrared rays in the direction of the film 2 to be measured, and may be a nonspherical reflection mirror such as a flat plate or the like.

The reference infrared ray source 5 is provided on the opening side of the mirror 3 across a chopper 6, which is composed of a moving blade-type disc with notch portions 7 being provided therein so as to constitute a kind of opening or closing means. The chopper 6 is adapted to apply the infrared rays onto the mirror 3 only when the notch portions 7 are located in front of the reference infrared ray source 5, and the chopper 6 interrupts the reference infrared rays when the notch portions 7 are not located in front of the reference infrared ray source 5. The chopper 6 is rotated by means of a motor M1 to shift the position of the notch portions 7 before the reference infrared ray source 5. Whether or not the notch portions 7 are located in front of the reference infrared ray source 5 is detected by the position detector T1. Then T1 outputs a signal to the mode discriminating device 14 as mentioned hereinafter.

A plane total reflection mirror 8, which is placed above the substance 1, is adapted to horizontally move by means of reciprocating motion to be driven by a motor M2, in parallel to the substance 1 to reflect the infrared rays coming from the reference infrared ray source 5 and to simultaneously interrupt the incidence of the light rays coming from the direction of the measured material. Namely, the plane total reflection mirror 8 is adapted to intermittently move in the horizontal direction under the reference infrared ray source 5 and the mirror 3 so that the infrared rays radiated from the reference infrared ray source 5, which are reflected by the mirror 3 in the direction of the coated film to be measured are re-reflected in the direction of the condenser 11, when the plane total reflection mirror 8 is located under the mirror 3, to simultaneously interrupt the material temperature light rays, which are the temperature signals to be radiated by the measured material itself, and the external-noise light rays, which are the infrared rays of the noises coming from the materials and so on around the surface layer thickness measuring apparatus, whether the plane total reflection mirror 8 is located under the reference infrared ray source 5 or the mirror 3 is detected by the position detector T2. Then T2 outputs a signal to the mode discriminating device 14. Also, a rotary sector 9 having at least one filter portion 10, which lets only the infrared rays of the wave length within the given range pass through, is disposed above the aperture 4 of the mirror 3. The rotary sector 9 is rotated optionally by means of a motor M3 to shift the positions of various filters provided thereon against the aperture 4 of the mirror 3, and the position detector T3 detects which filter, that is range of wave length, is used for measurement and outputs the signal into the signal processing device 13 as mentioned hereinafter. The condenser 11 and an infrared ray sensor 12, i.e., a light ray receiving element which converts the infrared rays received into electric signals are disposed above the rotary sector 9.

It is to be noted that the rotary sector 9 may be disposed between the condenser 11 and the infrared ray sensor 12. Also, the rotary sector 9 is not necessary when the measuring operation is not required with a plurality of wave length ranges, and only the filter portion 10 may be used, being fixed. The mode discriminating device 14 discriminates the operation mode, which will be explained hereinafter, with the signals coming from the position detector T1 and T2 to output the four operation mode signals into the signal processing device 13. The signal processing device 13 processes the input signals, that is, the operation mode signals from a mode discriminating device 14, the measuring wave length range signals from the position detector T3, and the electric signals from the infrared ray sensor 12, and outputs a true film thickness signal as mentioned hereinafter to the coated film thickness converting device 15. The coated film thickness converting device 15 converts the signals from the signal processing device 13 into the coated film thickness value, the coating weight value or the attaching layer thickness value.

Figure 4:
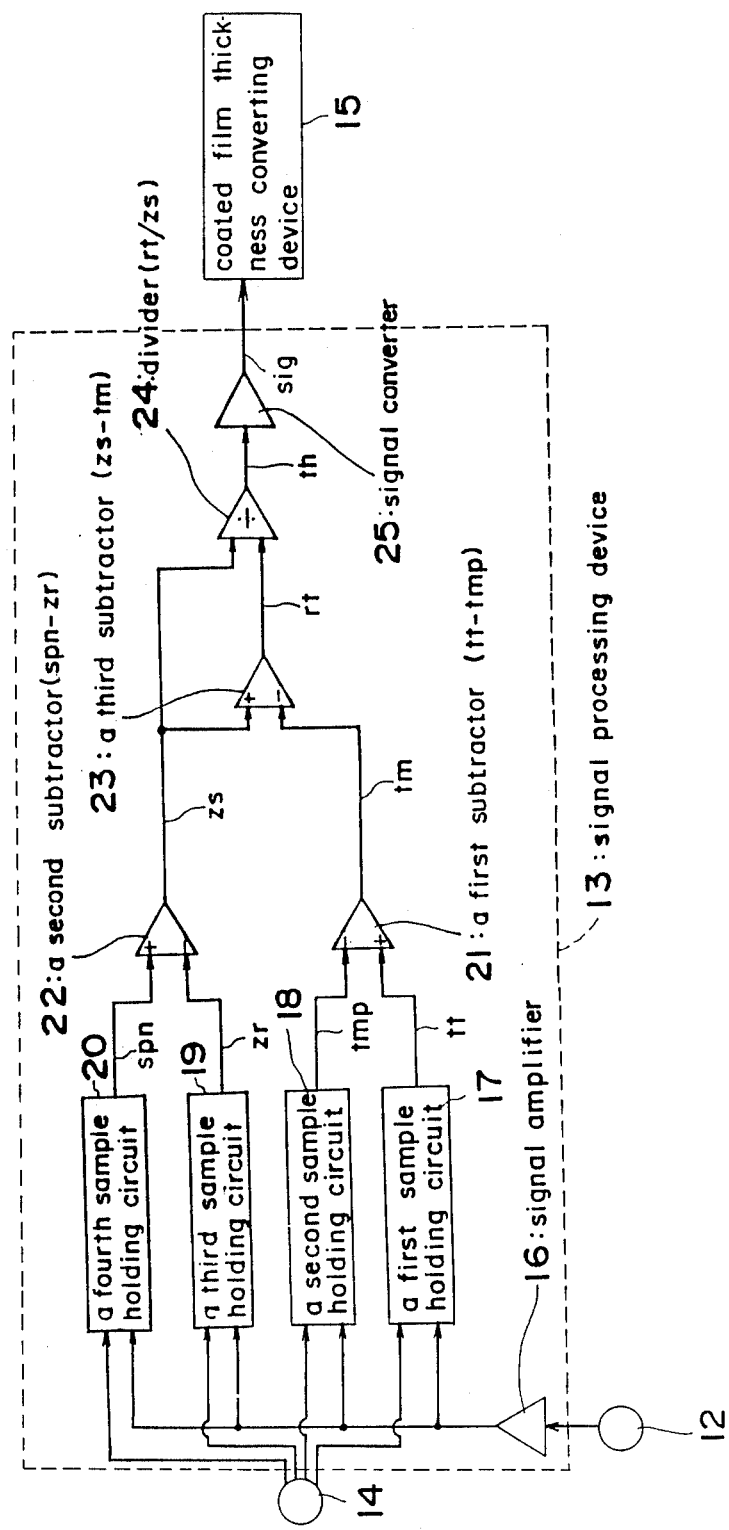
FIG. 4 is a schematic, electric diagram showing a circuit of a signal processing device employed in the apparatus of FIG. 1.

The signal processing device 13 includes a signal amplifier 16 to amplify an output from the infrared ray sensor 12, a plurality of sample holding circuits 17 to 20 each corresponding to the respective operation mode signal, substractors 21 and 22 each outputting a signal related to the subtraction between the outputs from the two of the sample holding circuits, subtractor 23 outputting a signal related to the subtraction between the outputs from subtractors 21 and 22, a divider 24 outputting a signal related to the division between the outputs from the two of subtractors, and a signal converter 25 for converting the output from divider 24 into such a signal that can be processed in the coated film thickness converting device 15 and outputting said signal to the coated film thickness converting device 15, as shown in FIG. 4. FIG. 4 shows an example of the case where the thickness is measured in a single wave length range as mentioned hereinafter.

Also, the motors M1, and M2 provide with the respective control circuits (not shown) for controlling the driving condition of the motors in order to set up the respective operation modes.

The operation of the surface layer thickness measuring apparatus composed of the above components will be mentioned hereinafter.

TABLE 1

| Operation Mode | Thickness Mode | Material Temperature Mode | Zero Mode | Span Mode |
|---|---|---|---|---|
| chopper operation | infrared ray radiation | infrared ray interruption | infrared ray interruption | infrared ray radiation |
| plane total reflection mirror position | under reference infrared ray source | under reference infrared ray source | under spherical reflection mirror | under spherical reflection mirror |

Referring to Table 1, the operation of this surface layer thickness measuring apparatus has four operation modes, i.e., thickness mode, material temperature mode, zero mode, and span mode through the combination of the radiation and interrupting operation of the reference infrared rays by the chopper 6 and the position of the plane total reflection mirror 8 which is under the reference infrared ray source 5 or under the mirror 3. The reception signals of the infrared ray sensor 12 in each operation mode will be described hereinafter.

Thickness Mode

The condition is equivalent to the case where both the chopper 6 and the plane total reflection mirror 8 are not provided in this mode.

Therefore, assume that the energy signal to be received by the infrared ray sensor 12 is $E_1$ in the thickness mode, the energy signal is as follows.

$$E_1 = e_1' + e_2' + e_3 + e_4 + e_5$$

wherein:
$E_1$: the amount of energy to be received by the infrared ray sensor 12 in the thickness mode
$e_1'$: infrared ray energy unabsorbed by the coated film from among the energy radiated by the reference infrared ray source 5
$e_2'$: infrared ray energy unabsorbed by the coated film from among the mirror-temperature energy
$e_3$: the temperature energy of the substance to be measured
$e_4$: the energy of the external noise light rays
$e_5$: the temperature energy in the surface layer thickness measuring apparatus Material Temperature Mode In this mode, the condition is equivalent to a case where the reference infrared ray source 5 does not exist, because the chopper 6 interrupts the reference infrared rays radiated by the reference infrared ray source 5. Therefore, $$E_2 = e_2' + e_3 + e_4 + e_5 + e_6'$$

is received, wherein:
$E_2$: the amount of energy to be received by the infrared ray sensor 12 in the material temperature mode
$e_6'$: infrared ray energy unabsorbed by the coated film from among the chopper temperature energy

ZERO Mode

In this mode, the chopper 6 interrupts the reference infrared rays radiated by the reference infrared ray source 5 and simultaneously the plane total reflection mirror 8 comes under the mirror 3 to interrupt the material temperature light rays and the external noise light rays coming from the direction of the measured material. Therefore, $$E_3 = e_2 + e_5 + e_6 + e_7$$

is received, wherein:
$E_3$: the amount of energy to be received by the infrared ray sensor 12 in the zero mode
$e_2$: mirror temperature energy
$e_6$: chopper temperature energy
$e_7$: the temperature energy of the plane total reflection mirror 8

SPAN Mode

In this mode, the reference infrared rays radiated by the reference infrared ray source 5 are received. This is because the plane total reflection mirror 8 interrupts the incidence of the material temperature light rays, the external noise light rays and reflects in the direction of the condenser 11 the reference infrared rays which are radiated by the reference infrared ray source 5, but are not absorbed at all by the coated film. Therefore, $$E_4 = e_1 + e_2 + e_5 + e_7$$

is received, wherein:
$E_4$: the amount of energy to be received by the infrared ray sensor 12 in the span mode
$e_1$: energy radiated by the reference infrared ray source 5

The infrared ray sensor 12 converts the said respective energy signals received into the electric signals and transmits them to the signal processing device 13.

The signal processing device 13 discriminates which mode the signal, transmitted from the infrared ray sensor 12, belongs to by the signal from the mode discriminating device 14 so as to calculate the signal "S" to be described hereinafter. Thereafter, the signal is outputted into the coated film thickness converting device 15.

The relationship between the respective modes is as follows.

$$E_4 - E_3 = e_1 - e_6$$

On the other hand, $$E_1 - E_2 = e_1' - e_6'$$

The value is one left after the subtracting the energy amount E absorbed by the coated film from $E_4 - E_3$.

Accordingly, $$(E_4 - E_3) - E = E_1 - E_2$$

Thus, $$E = (E_4 - E_3) - (E_1 - E_2) = (e_1 - e_6) - (e_1' - e_6')$$

This E may be converted into the thickness of the coated film 2 through the calculation by the coated film thickness converting device 15. But as $e_1$ and $e_6$ accompany the time-lapse variation, $e_1'$ and $e_6'$ also accompany the time-lapse variation, and the other optical system and electric system also accompany the time-lapse variation. Accordingly, the electric processing is performed within the signal processing device 13 so that $e_1 - e_6$, i.e., $E_4 - E_3$, may become the full scale of the output of the signal processing device 13.

$$S = \frac{E}{E_4 - E_3} \times 100 = \left(1 - \frac{E_1 - E_2}{E_4 - E_3}\right) \times 100$$

$$= \left(1 - \frac{e_1' - e_6'}{e_1 - e_6}\right) \times 100 \, (\%)$$

This "S" may be converted into the thickness of the coated film 2 by the calculation through the coated film thickness converting device 15.

In the next place, the internal action of the signal processing device 13 which calculates said signal "S" will be mentioned.

The mode discriminating device 14, after discriminating the thickness mode, outputs a signal to a first sample holding circuit 17. After receiving the signal, the first sample holding circuit 17 holds an output signal, at that time, a signal amplifier 16, and then outputs that signal to a first subtractor 21.

Similarly, the mode discriminating device 14, after discriminating a material temperature mode, zero mode and span mode, outputs the signals corresponding to those modes to a second sample holding circuits 18, a third sample holding circuit 19 and a fourth sample holding circuit 20 respectively. At that time, those sample holding circuits hold an output signal of the signal amplifier 16 and then output to the subtractors.

Thus sample held outputs in each operation mode from an infrared ray sensor 12 which have been amplified through the signal amplifier 16 are calculated through the subtractors 21 to 23 and a divider 24, and the output signal "th" from the divider 24 is represented with the following formula;

$$th = rt/zs = \frac{zs - tm}{zs} = 1 - \frac{tm}{zs}$$

$$= 1 - \frac{tt - tmp}{spn - zr}$$

wherein tt, tmp, spn, zr are outputs from the sample holding circuits 17 to 20, respectively, and zs, tm, rt are outputs from the subtractors, respectively.

This "th" corresponds to said signal "S". And tt, tmp, zr and spn correspond to said E1, E2, E3 and E4, respectively.

Then the signal converter 25 converts the signal "th" into such a signal "sig" that can be processed in the coated film thickness converting device 15.

While in the present embodiment of signal processing device 13, the example of the thickness measurement in a single wave length range is explained, the desired measurement in a plurality of wave length ranges may be made by providing in the signal processing device 13 the mentioned components for each wave length range. In that case, each wave length range to be measured is discriminated with the output signal from the position detector T3 as mentioned above.

And the embodiment of measuring the coated film thickness on the surface of substance by using the infrared rays has been described, but the same thing can be said even in a case where the layer thickness, the layer weight or the like on the substance may be measured with the use of the other light rays, for instance, the ultraviolet rays or the visual light rays. Also, the motors M1, M2 and M3 may be made into one. A part of the signal processing device 13 and the coated film thickness converting device 15 may be replaced by a computer into one unit.

In the above description, the plane total reflection mirror 8 has been described as movable, but the plane total reflection mirror 8 may be fixed and in such case, a part of the apparatus except for the plane total reflection mirror 8 has to be movable between the surface position of the measured and the plane total reflection mirror 8.

As is clear from the above description, the surface layer thickness measuring apparatus in accordance with the present invention is lower in price with only one light ray measuring system being used therein.

In addition, the correct surface layer thickness may be measured, independently of the variation in the temperature of the measured, in the external noise light rays, in the radiation energy of the reference infrared ray source, in the chopper temperature, and the influences by the temperature energy in the surface layer measuring apparatus, through the mode combination by the driving operation of the opening or closing apparatus and the plane total reflection mirror.

Namely, the coated film thickness measuring apparatus in accordance with the present invention has the following extremely superior advantages in the measuring system.

1. no influences through the variation in the temperature of the measured material,
2. no influences through the external noise light rays,
3. no influences through the temperature energy in the surface layer thickness measuring apparatus,
4. no influences through the temperature variation (reference infrared ray amount) in the reference infrared ray source,
5. no influences through the variation in the temperature of the chopper, and
6. drift of ZERO point of its own, drift of the SPAN of its own may be corrected, thus resulting in no influences through the time-lapse variation of the optical system, and no influences through the time-lapse variation of the electric system.

In addition, the apparatus of the present invention, through the comparison with the conventional apparatus, has the following advantages.

Figure 5A:
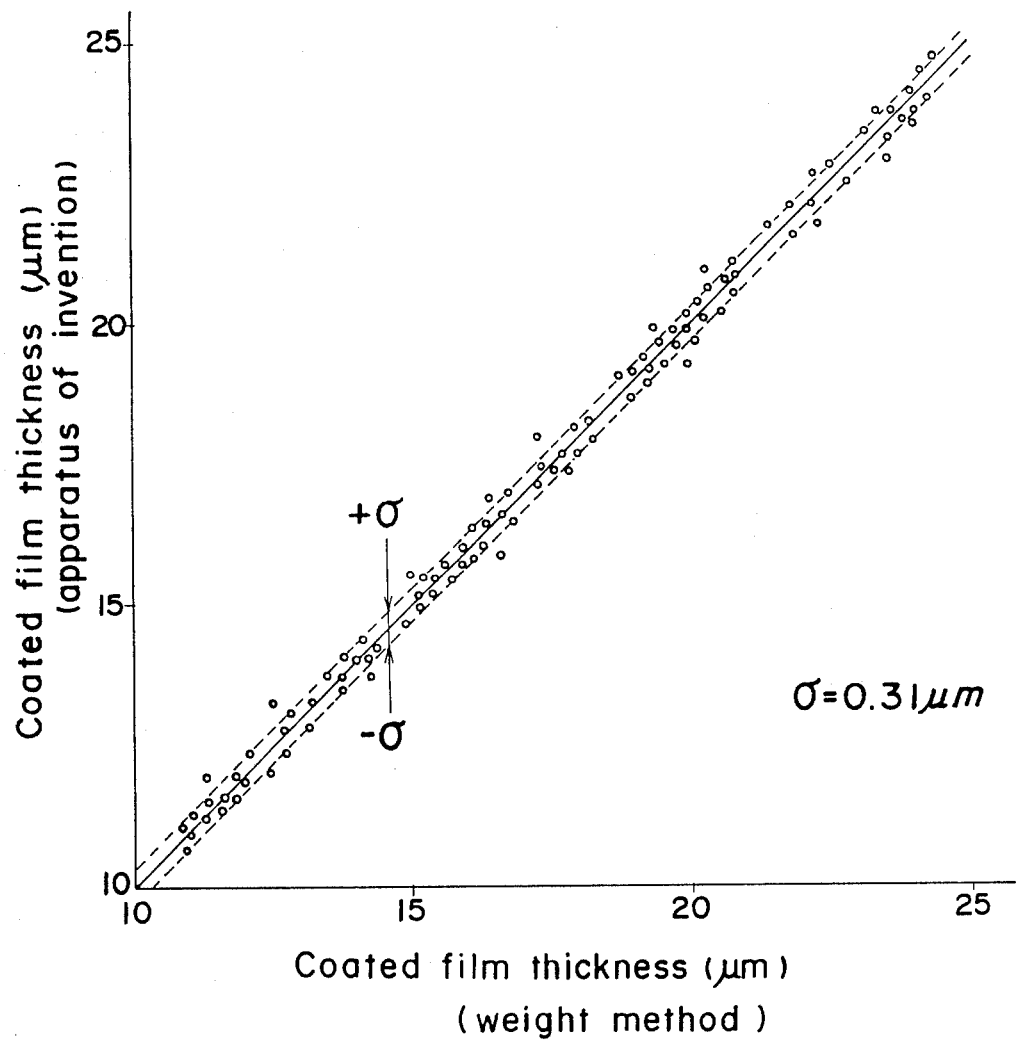
FIGS. 5(a) and 5(b) are graphs showing experimental data of paint thickness obtained by using the apparatuses of the present invention and a conventional one.
Figure 5B:
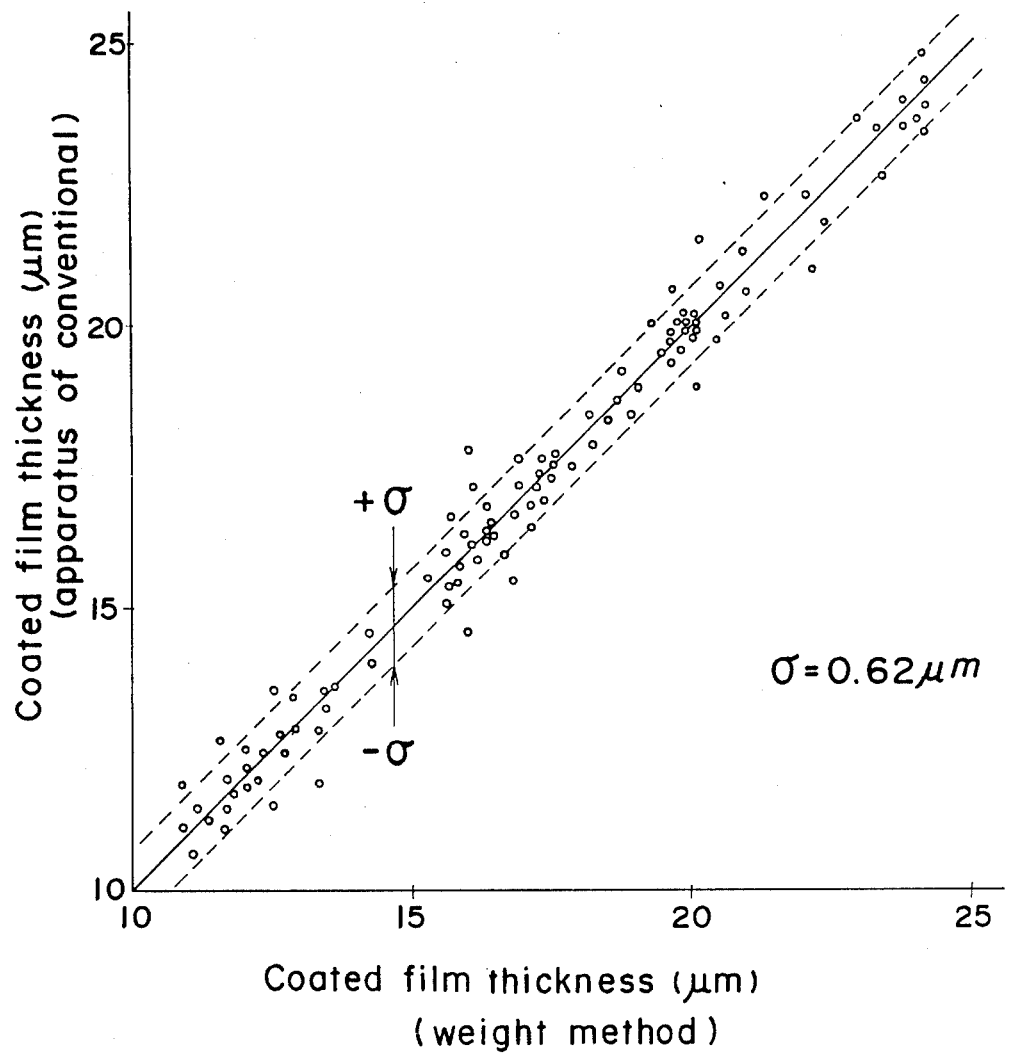

1. superior maintenance property because of the self-correction of the ZERO point and the SPAN
2. lower in price For example, FIGS. 5(a) and 5(b) show the comparison of coated film thickness between the apparatus of the present convention and the weight method and between the conventional apparatus disclosed in Japanese Patent Publication (unexamined) Tokkaisho No. 58-115306 and the weight method respectively, FIG. 5(a) presenting the datum having a standard deviation of 0.31 $\mu$m between the coated film thickness obtained by the apparatus of the present invention and by the weight method, while FIG. 5(b) presents the datum having a standard deviation of 0.62 $\mu$m between the coated film thicknesses obtained by the apparatus of the conventional and by the weight method. It is clearly recognized by the data of FIGS. 5(a) and 5(b) that the apparatus of the present invention is superior to the conventional one in such an evaluation value of the standard deviation by half.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A surface layer thickness measuring apparatus comprising a reference light ray source for radiating light rays, a mirror for reflecting the light rays coming from the reference light ray source against the surface of a layer applied to the surface of a substance, an opening or closing means located between said mirror and said reference light ray source to perform the screening operation and the opening operation between them, a plane total reflection mirror located between said mirror and the measured surface layer to be measured to perform the screening operation and the opening operation between them, a light ray sensor for detecting the light ray amount from said total reflection mirror or the light ray amount reflected on said substance without being totally absorbed by said surface layer to be measured, a mode discriminating device for discriminating the combination of said opening or closing means and said plane total reflection mirror, a signal processing device for calculating the signals so that the signals showing only the light ray amount either absorbed by said surface layer to be measured or reflected by a substance without being absorbed by said surface layer may be drawn out from the light ray sensor output, and a surface layer thickness converting device for converting the signals from said signal processing device into the surface layer thickness.

2. The surface layer thickness measuring apparatus in accordance with claim 1, wherein said mirror is a spherical mirror.

3. The surface layer thickness measuring apparatus in accordance with claim 1, wherein said mirror is a non-spherical mirror.

* * * * *